US007854415B2

(12) United States Patent
Holbrook et al.

(10) Patent No.: US 7,854,415 B2
(45) Date of Patent: Dec. 21, 2010

(54) MOTORIZED SUPPORT FOR A TELEVISION OR OTHER ELECTRONIC DISPLAY

(75) Inventors: Paul Holbrook, Buffalo Grove, IL (US); Sigurd A. Nelson, II, Highland Park, IL (US); Tony J. Abfall, Mount Prospect, IL (US); David M. Waskin, Palatine, IL (US)

(73) Assignee: Peerless Industries, Inc., Aurora, IL (US)

( * ) Notice: Subject to any disclaimer, the term of this patent is extended or adjusted under 35 U.S.C. 154(b) by 397 days.

(21) Appl. No.: 11/999,295

(22) Filed: Dec. 4, 2007

(65) Prior Publication Data

US 2008/0151483 A1    Jun. 26, 2008

Related U.S. Application Data

(60) Provisional application No. 60/872,696, filed on Dec. 4, 2006.

(51) Int. Cl.
*A47F 5/00* (2006.01)
(52) U.S. Cl. ............... 248/125.2; 248/418; 248/922; 361/679.22
(58) Field of Classification Search ............ 248/125.2, 248/371, 418, 917, 919, 922, 282.1; 361/679.22
See application file for complete search history.

(56) References Cited

U.S. PATENT DOCUMENTS

| | | | |
|---|---|---|---|
| 4,796,842 A * | 1/1989 | Hamada et al. | 248/186.2 |
| 5,353,902 A | 10/1994 | Flowtow et al. | |
| 5,401,089 A | 3/1995 | Inagaki et al. | |
| 5,583,735 A | 12/1996 | Pease et al. | |
| 5,847,685 A | 12/1998 | Otsuki | |
| 5,941,615 A | 8/1999 | Ito et al. | |
| 5,974,643 A | 11/1999 | Hays et al. | |
| 6,005,641 A | 12/1999 | Ui | |
| 6,012,785 A | 1/2000 | Kawasaki | |
| 6,149,253 A | 11/2000 | Talasani | |

(Continued)

OTHER PUBLICATIONS

Peerless Articulating Wall Arm; Model Nos. SA740P and SA740P-S; www.peerlessindustries.com; publicly available prior to Dec. 4, 2006.

(Continued)

*Primary Examiner*—Terrell Mckinnon
*Assistant Examiner*—Bradley H Duckworth
(74) *Attorney, Agent, or Firm*—Foley & Lardner LLP

(57) ABSTRACT

A support for an electronic display is provided. The support is movable through a panning motion by both manual manipulation and a motor. The support may include a clutch that facilitates both manual and motorized panning of the electronic display. The support is manually movable between a retracted position and an extended position. The support is also capable of supporting a relatively heavy load, such as a television or a computer monitor, and rotating the heavy load through a panning motion with a relatively small motor. The support may include a thrust bearing to facilitate panning of the heavy load. The support also includes a clutch that prevents stripping or damage of electrical components in the event panning motion is inhibited, such as by engagement of the electronic display with a wall. The support also includes a plurality of mechanical components that are removable as a single unit.

10 Claims, 21 Drawing Sheets

U.S. PATENT DOCUMENTS

| | | | |
|---|---|---|---|
| 6,158,359 A | 12/2000 | Allan et al. | |
| 6,163,451 A * | 12/2000 | Chiu | 361/679.22 |
| 6,344,968 B2 | 2/2002 | Kim et al. | |
| 6,416,027 B1 | 7/2002 | Hart | |
| 6,424,386 B1 * | 7/2002 | Shimizu | 348/837 |
| 6,442,030 B1 | 8/2002 | Mammoser et al. | |
| 6,480,161 B2 | 11/2002 | Watson | |
| 6,484,993 B2 | 11/2002 | Huffman | |
| 6,510,049 B2 | 1/2003 | Rosen | |
| 6,517,131 B1 | 2/2003 | Haataja | |
| 6,559,806 B1 | 5/2003 | Watson | |
| 6,565,167 B1 | 5/2003 | Miller et al. | |
| 6,680,843 B2 | 1/2004 | Farrow et al. | |
| 6,726,164 B1 | 4/2004 | Baiza et al. | |
| 6,738,094 B1 | 5/2004 | Minami et al. | |
| 6,814,009 B2 | 11/2004 | Acevedo et al. | |
| 6,856,303 B2 * | 2/2005 | Kowalewski | 345/31 |
| 6,955,447 B2 | 10/2005 | Lui | |
| 7,111,814 B1 | 9/2006 | Newman | |
| 7,185,868 B2 * | 3/2007 | Wang | 248/422 |
| 7,187,554 B2 | 3/2007 | Seki et al. | |
| 7,296,774 B2 | 11/2007 | Oh | |
| 7,677,517 B2 * | 3/2010 | Suzuki | 248/349.1 |
| 2006/0016941 A1 | 1/2006 | Choi et al. | |
| 2006/0037426 A1 | 2/2006 | Teller | |
| 2006/0171105 A1 * | 8/2006 | Hsiao | 361/681 |
| 2006/0175476 A1 | 8/2006 | Hasegawa et al. | |
| 2006/0232527 A1 * | 10/2006 | Oh | 345/87 |
| 2007/0030647 A1 | 2/2007 | Chen et al. | |
| 2007/0053151 A1 | 3/2007 | Capoferri et al. | |
| 2007/0096606 A1 | 5/2007 | Ryu | |
| 2007/0125917 A1 | 6/2007 | Oh et al. | |
| 2007/0146987 A1 | 6/2007 | Sakata et al. | |
| 2007/0158515 A1 | 7/2007 | Dittmer et al. | |
| 2007/0200962 A1 | 8/2007 | Choi et al. | |
| 2007/0258200 A1 | 11/2007 | Choi et al. | |
| 2007/0262627 A1 | 11/2007 | Clapper et al. | |
| 2007/0279519 A1 | 12/2007 | Sukenari et al. | |
| 2008/0100997 A1 * | 5/2008 | Chen | 361/681 |

OTHER PUBLICATIONS

Chief Professional Audio/Visual Mounting Solution; Model No. CM1-W18; www.chiefmfg.com; publicly available prior to Dec. 4, 2006.

K2 X-Arm Motorized Plasma and LCD Mount; Model No. K2XARM; www.htmarket.com/x-arm.html; publicly available prior to Dec. 4, 2006.

U.S. Appl. No. 12/479,357, filed Jun. 5, 2009, Bogdan Grabania et al.

\* cited by examiner

US 7,854,415 B2

MOTORIZED SUPPORT FOR A TELEVISION OR OTHER ELECTRONIC DISPLAY

RELATED APPLICATIONS

The present application claims priority to U.S. Provisional Patent Application Ser. No. 60/872,696, filed Dec. 4, 2006, the entire contents of which is hereby incorporated by reference.

FIELD OF THE INVENTION

The present invention generally relates to supports for televisions and other electronic displays and, more particularly, to motorized supports for televisions and other electronic displays.

BACKGROUND

In the past, televisions were supported either on a ground surface, such as a floor of a house, or by an entertainment system, which generally includes a plurality of support surfaces for supporting a television and a variety of other entertainment accessories, such as DVD players, VHS players, audio equipment, etc. Other electronic displays, such as computer monitors, were typically supported on a desk-top.

With the development of LCD, plasma, and other thin and lightweight electronic displays, such as, for example, televisions and computer monitors, the displays are capable of being supported in different manners. For example, these types of thin and lightweight display devices can be mounted directly to a wall of a house, office, or other structure. Also for example, a support may be connected directly to a wall and a electronic display may be connected to the support. Such supports enable the electronic display to be movable between a retracted position, in which the electronic display is near the wall, and an extended position, in which the electronic display is moved away from the wall. Also, such supports enable panning of the electronic display.

However, operation of such supports has been limited. More particularly, some of these supports are purely manual, thereby placing all the burden onto the user to move the support and connected electronic display. Also, some of these supports are purely motorized, thereby performing all movement of the support and connected electronic display by a motorized mechanism. Such completely motorized supports rarely position the support and connected electronic display in the exact desired location and oftentimes limit the number of positions in which a user can position the support and connected electronic display. Also, such completely motorized supports do not enable manual manipulation of the support or electronic display. Any attempt to manually adjust the support or electronic display will strip or otherwise damage the mechanical components within the support. Further, such completely motorized supports include a large quantity of moving parts, thereby elevating the consumer price of such supports and increasing the chance that malfunction will occur. When a malfunction does occur, the entire support must be taken apart or a professional must troubleshoot the issue, both of which create very high repair costs or at least are burdensome and time consuming to repair. Further yet, such completely motorized supports must occupy a particular extension distance from a wall before panning can occur. In other words, the panning motion is dependent on the extension position (i.e., distance from the wall) and cannot occur unless the support occupies the particular position. Again, these types of restraints limit the possibilities available to consumers.

SUMMARY

In some aspects, a motorized support is provided for supporting electronic display devices such as a television, a computer monitor, etc., and for moving the electronic display device through a panning movement.

In other aspects, a motorized support is provided for supporting electronic display devices on a substantially vertical surface and for moving the electronic display devices through a panning movement.

In still other aspects, a motorized support is provided for supporting electronic display devices on a substantially horizontal surface and for moving the electronic display devices through a panning movement.

In further aspects, a support for an electronic display is provided and includes a base, a bracket coupled to the base and operable to support the electronic display, and a motor coupled to the bracket, the bracket being rotatable through a panning motion both by manual manipulation and by the motor.

In still further aspects, a motorized support for an electronic display is provided and includes a base engagable with a support surface, a bracket coupled to the base and operable to support the electronic display, a motor coupled to the bracket for rotating the bracket through a panning motion, and a thrust bearing coupled between the base and the bracket.

In yet other aspects, a motorized support for an electronic display is provided and includes a base, a bracket coupled to the base and operable to support the electronic display, a motor coupled to the bracket for rotating the bracket through a panning motion, and a clutch coupled to the motor, the clutch having a first condition, in which the motor rotates the bracket through the panning motion when the motor is activated, and a second condition, in which the motor does not rotate the bracket through the panning motion when the motor is activated.

In yet further aspects, a motorized support for an electronic display is provided and includes a base, an arm rotatably coupled to the base, the arm being movable between a retracted position and an extended position and includes at least one intermediate position between the retracted position and the extended position, a bracket coupled to the arm and operable to support the electronic display, wherein the bracket is positioned a first distance from the base when the arm is in the retracted position and is positioned a second distance from the base when the arm is in the extended position, the second distance being greater than the first distance, and a motor coupled to the bracket for rotating the bracket through a panning motion, the motor being operable to rotate the bracket through the panning motion independent of the position occupied by the arm.

In some aspects, a motorized support for an electronic display is provided and includes a base engagable with a support surface, an arm rotatably coupled to the base, a thrust bearing supported by the arm, the thrust bearing including a first portion, a second portion, and a plurality of ball bearings positioned between the first and second portions, the first portion being rotatable relative to the second portion and the second portion being supported by the arm, a bracket supported by the first portion of the thrust bearing and being rotatable with the first portion relative to the second portion of the thrust bearing, the bracket being operable to support the electronic display and including an aperture therethrough, a gear housing removably connected to the bracket, a motor supported by the gear housing, a gear assembly supported by the gear housing and coupled to the motor, a shaft extending through the aperture in the bracket, the thrust bearing being substantially concentrically positioned around the shaft, a transfer gear supported by the shaft and being substantially concentrically positioned around the shaft, wherein the transfer gear is fixed relative to the shaft and is coupled to the gear assembly, the arm being movable to position the bracket, and the electronic display when supported by the bracket, in any one of a retracted position, in which the bracket is positioned a first distance from the base, an extended position, in which the bracket is positioned a second distance from the base, and a plurality of intermediate positions between the retracted and extended positions, the second distance being greater than the first distance, and activation of the motor causes the bracket to rotate about the transfer gear and the shaft, thereby causing the bracket, and the electronic display when supported by the bracket, to rotate through a panning motion.

In other aspects, a motorized support for an electronic display is provided and includes a base engagable with a support surface, a bracket coupled to the base and operable to support the electronic display, a gear housing removably connected to the bracket, a motor supported by the gear housing and operable to rotate the bracket through a panning motion, and a gear supported by the gear housing and coupled to the motor, the gear being rotatable by the motor, the gear housing, the motor, and the gear being removable from the bracket as a single unit.

Independent features and independent advantages of the present invention will become apparent to those skilled in the art upon review of the detailed description and drawings.

Figure 1A:
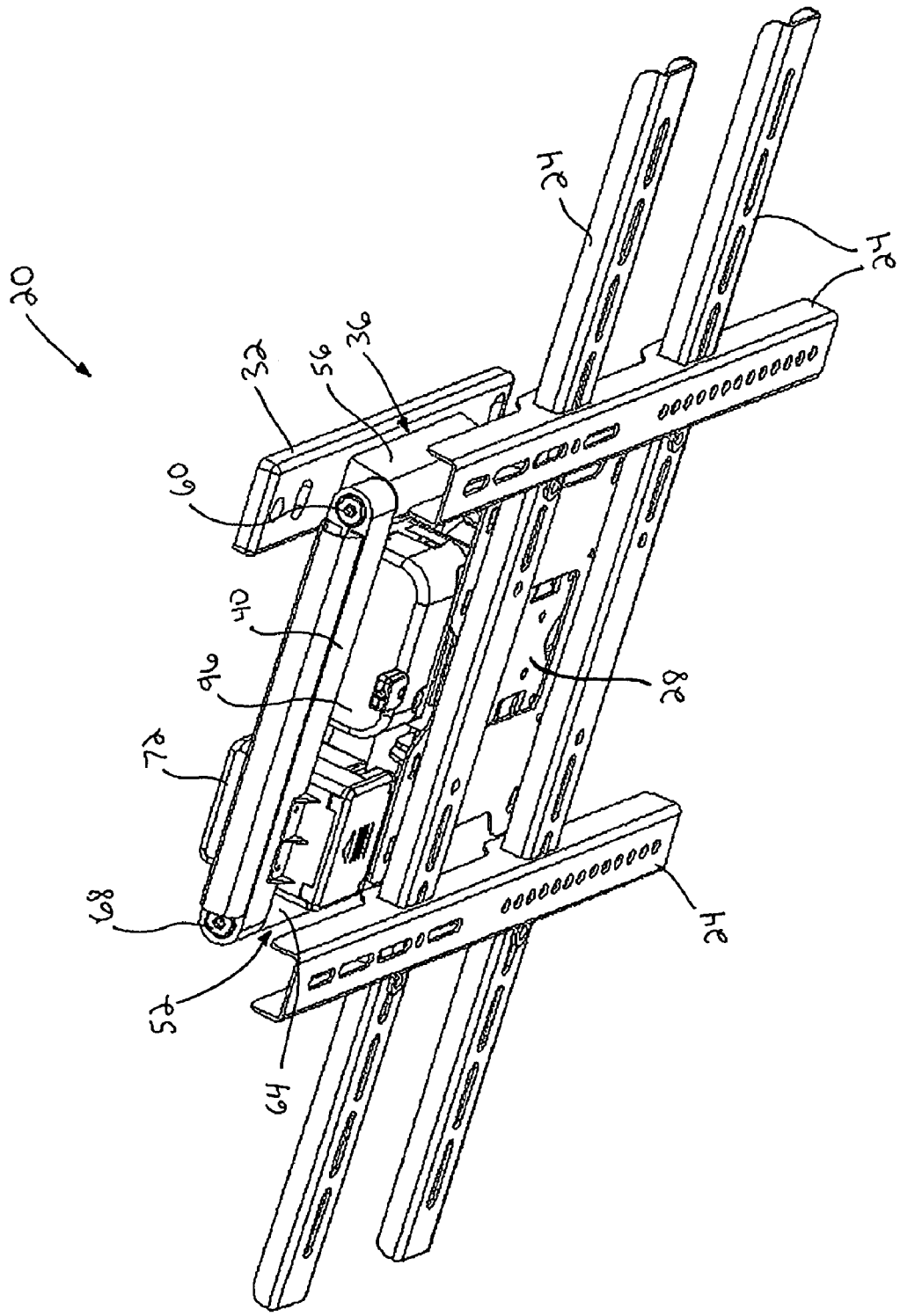
FIG. 1A is a front perspective view of a motorized support shown in a retracted position.

Before any independent features and embodiments of the invention are explained in detail, it is to be understood that the invention is not limited in its application to the details of the construction and the arrangement of the components set forth in the following description or illustrated in the drawings. The invention is capable of other embodiments and of being practiced or of being carried out in various ways. Also, it is understood that the phraseology and terminology used herein is for the purpose of description and should not be regarded as limiting.

DETAILED DESCRIPTION

Figure 1B:
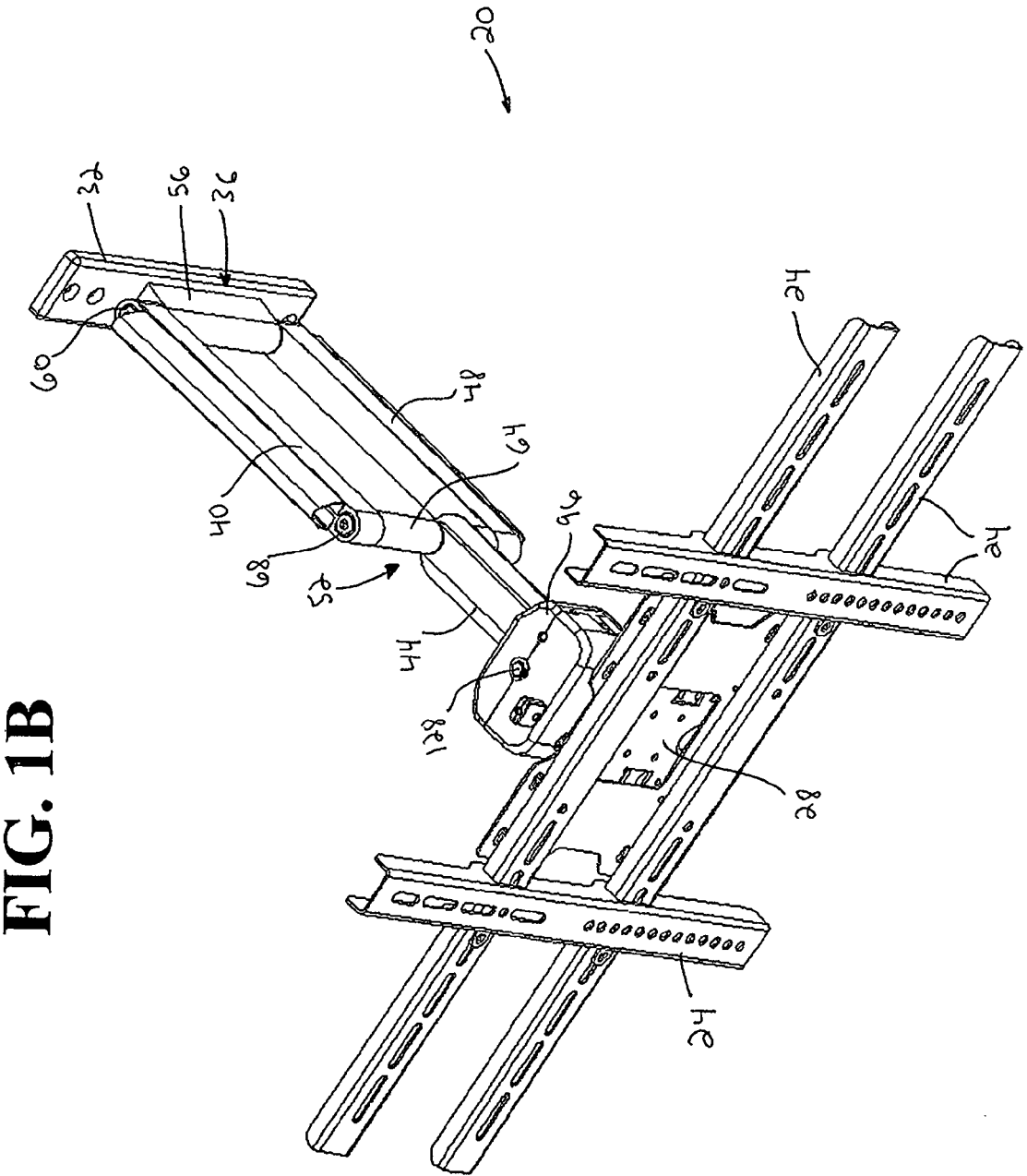
FIG. 1B is a front perspective view of the motorized support shown in FIG. 1A, shown in a fully extended position with a battery housing removed.
Figure 17:
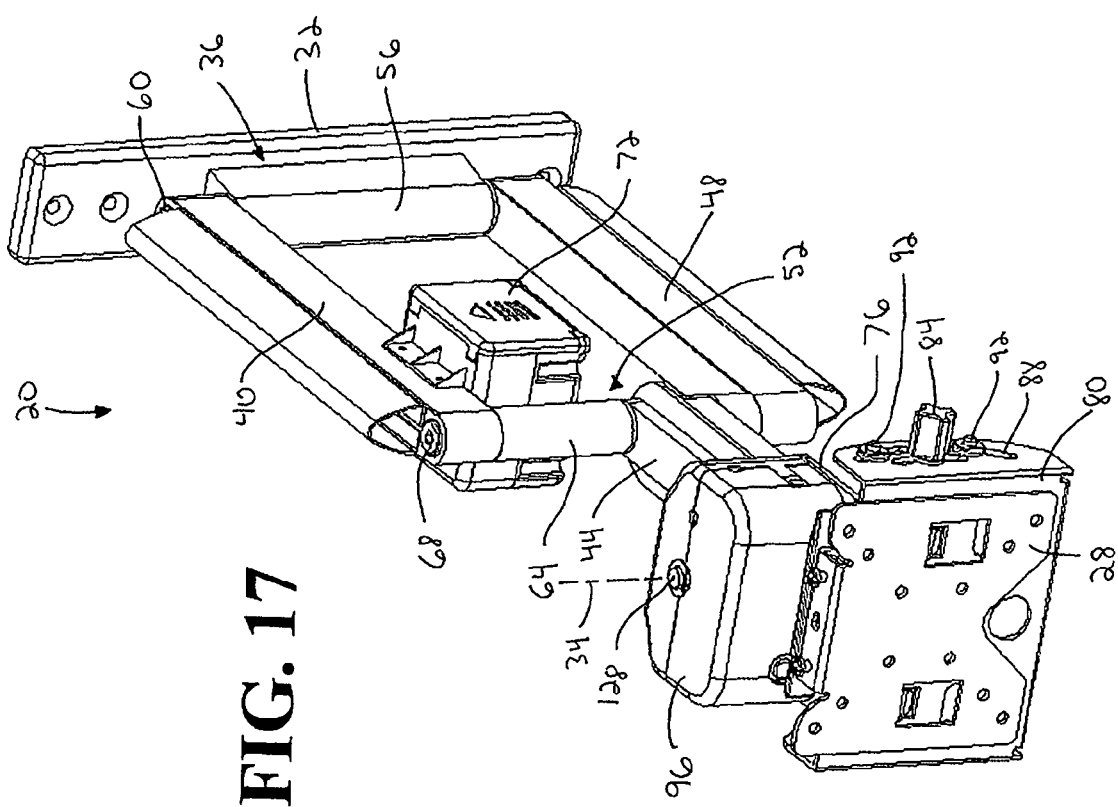
FIG. 17 is a front perspective view of the motorized support shown in FIGS. 1A and 1B, shown in a fully extended position with a battery housing.

With reference to FIGS. 1A, 1B, and 17, a motorized support 20 is illustrated and is operable to support electronic displays such as, for example, televisions, computer monitors, etc. Preferably, the motorized support 20 is used to support televisions. Hereafter, when referring to electronic displays, televisions will be cited for simplicity and consistency even though a wide variety of electronic displays are supportable by the motorized support 20. The motorized support 20 includes a plurality of brackets 24 and adapter brackets or adapter plates 28 (hereafter referred to as adapter plates 28) for mounting televisions thereto. The brackets 24 and adapter plates 28 are adjustable in order to support a wide variety of televisions on the motorized support 20. Alternatively, the motorized support 20 can include a wide variety of brackets 24 and adapter plates 28, each set of brackets 24 and adapter plates 28 compatible with a different type of television. For example, a first set of brackets 24 and adapter plate 28 is operable to attach a television of a first manufacturer to the motorized support 20 and a second set of brackets 24 and adapter plate 28 is operable to attach a television from a second manufacturer to the motorized support 20. The illustrated embodiment of the motorized support 20 is mountable to a wall or other substantially vertical support surface via a base or wall mount 32. A plurality of fasteners are used in conjunction with the wall mount 32 to properly secure the motorized support 20 to the wall.

The motorized support 20 is capable of performing a motorized panning motion of the television. A panning motion is known in the art as a left to right or right to left rotation of the television about a substantially vertical axis 34 (see FIGS. 6-10, 13, 17, and 18). In other words, when a user is looking at a television and the motorized support 20 performs a panning movement, the user will see the left edge of the television pivot forward toward the user and the right edge of the television pivot rearward away from the user, or vice versa. Manual manipulation is required to move the television between the retracted position shown in FIGS. 1A and 2 and a fully extended position shown in FIGS. 1B and 17. FIG. 3 shows the television in one of many intermediate positions between the retracted and fully extended positions. Manual manipulation is also required to tilt the television upward or downward about a horizontal axis (described in more detail below).

Figure 2:
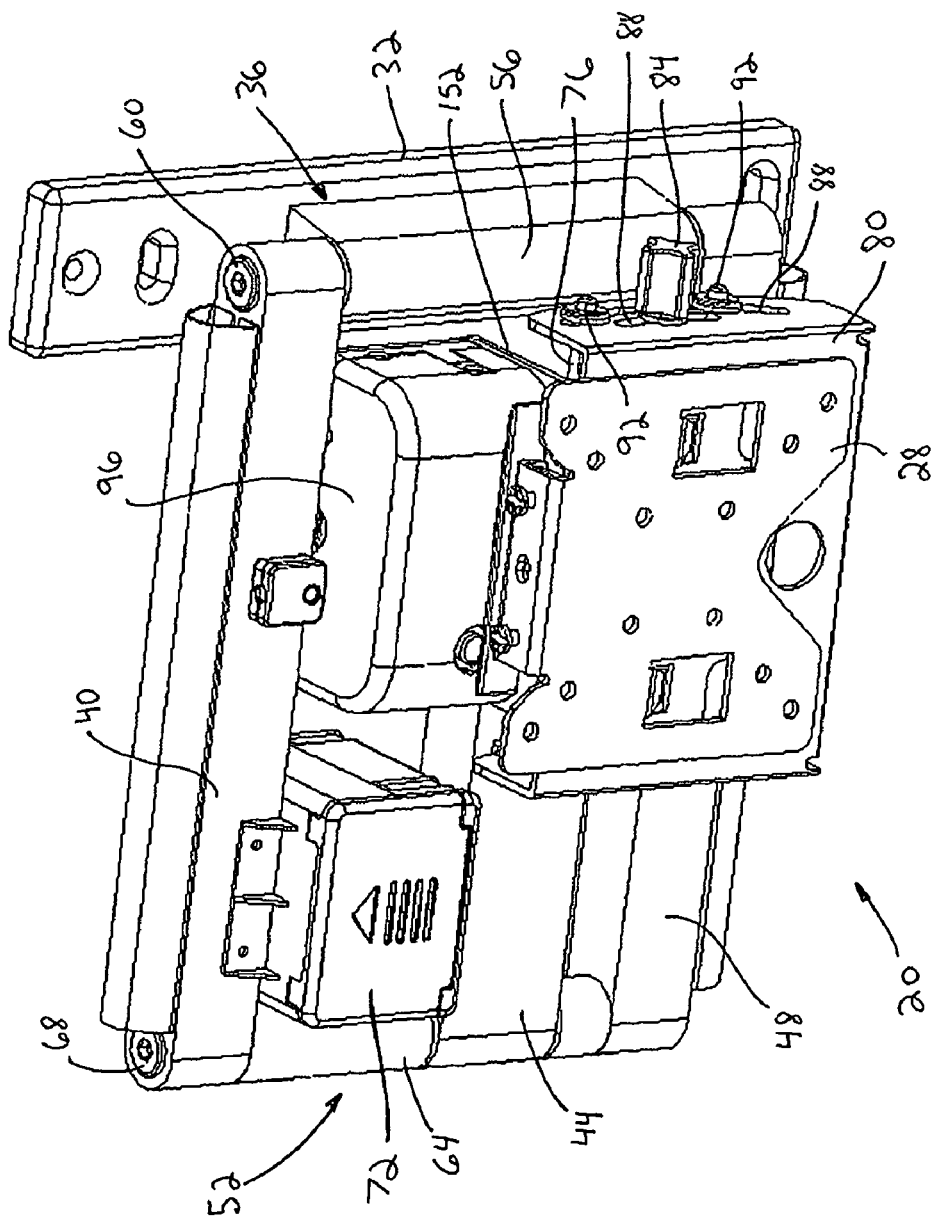
FIG. 2 is a front perspective view of the motorized support shown in FIG. 1A, shown in the retracted position.
Figure 3:
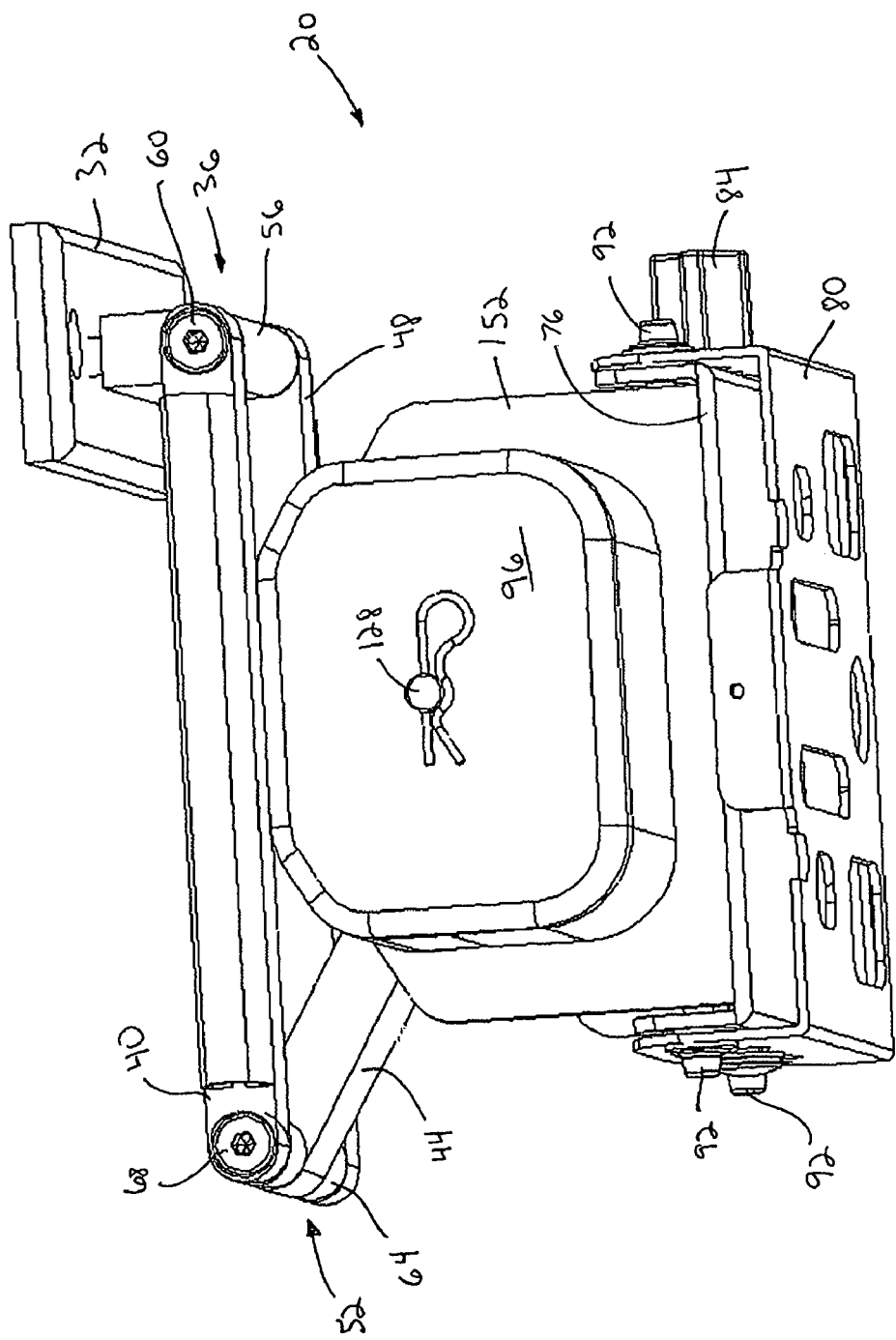
FIG. 3 is a front perspective view of the motorized support shown in FIG. 1A, shown in a partially extended position.

FIG. 2 illustrates the motorized support 20 in a retracted position, in which the television and motorized support 20 are as close to the wall as possible, and FIG. 3 illustrates the motorized support 20 in an intermediate position, in which the television and motorized support 20 are partially positioned away from the wall. The motorized support 20 should be in at least an intermediate position to enable panning of the television, however, panning the support 20 is not dependent on a particular position of the support 20 away from the support surface. In other words, the support 20 can be panned with the support 20 in any of the intermediate or extended positions.

Referring particularly to FIG. 2, the motorized support 20 includes a first hinge 36, a first link arm 40, a second link arm 44, a third link arm 48, and a second hinge 52. The first hinge 36 includes a hinge housing 56 rigidly connected to or formed with the wall mount 32, and a hinge pin 60 extending through the hinge housing 56 and first ends of the first link arm 40 and the third link arm 48 to rotatably connect the first and third link arms 40, 48 to the wall mount 32. The first hinge 36 enables the first and third link arms 40, 48 to pivot toward and away from the wall. The second hinge 52 includes a second hinge housing 64 and a second hinge pin 68 extending through the second hinge housing 64, second ends of the first and third link arms 40, 48, and an end of the second link arm 44 to rotatably connect the second link arm 44 to the first and third link arms 40, 48. The second hinge 52 enables the second link arm 44 to pivot toward and away from the first and third link arms 40, 48. A battery housing 72 is connected to the first link arm 40 and supports batteries used to power the motorized support 20. Alternatively, the battery housing 72 can be supported by the second and third link arms 44, 48 or supported by any combination of the first, second, and third link arms 40, 44, 48. As an alternative to battery power, the motorized support 20 can be powered by alternating current (AC) received from a wall outlet and power cord. In such a case, the motorized support 20 includes an AC adapter for receiving AC power from the wall outlet via the power cord. Also, in the alternative, the motorized support 20 can be hard wired with AC power (i.e., no AC plugs, adapters, or outlets required).

Figure 4:
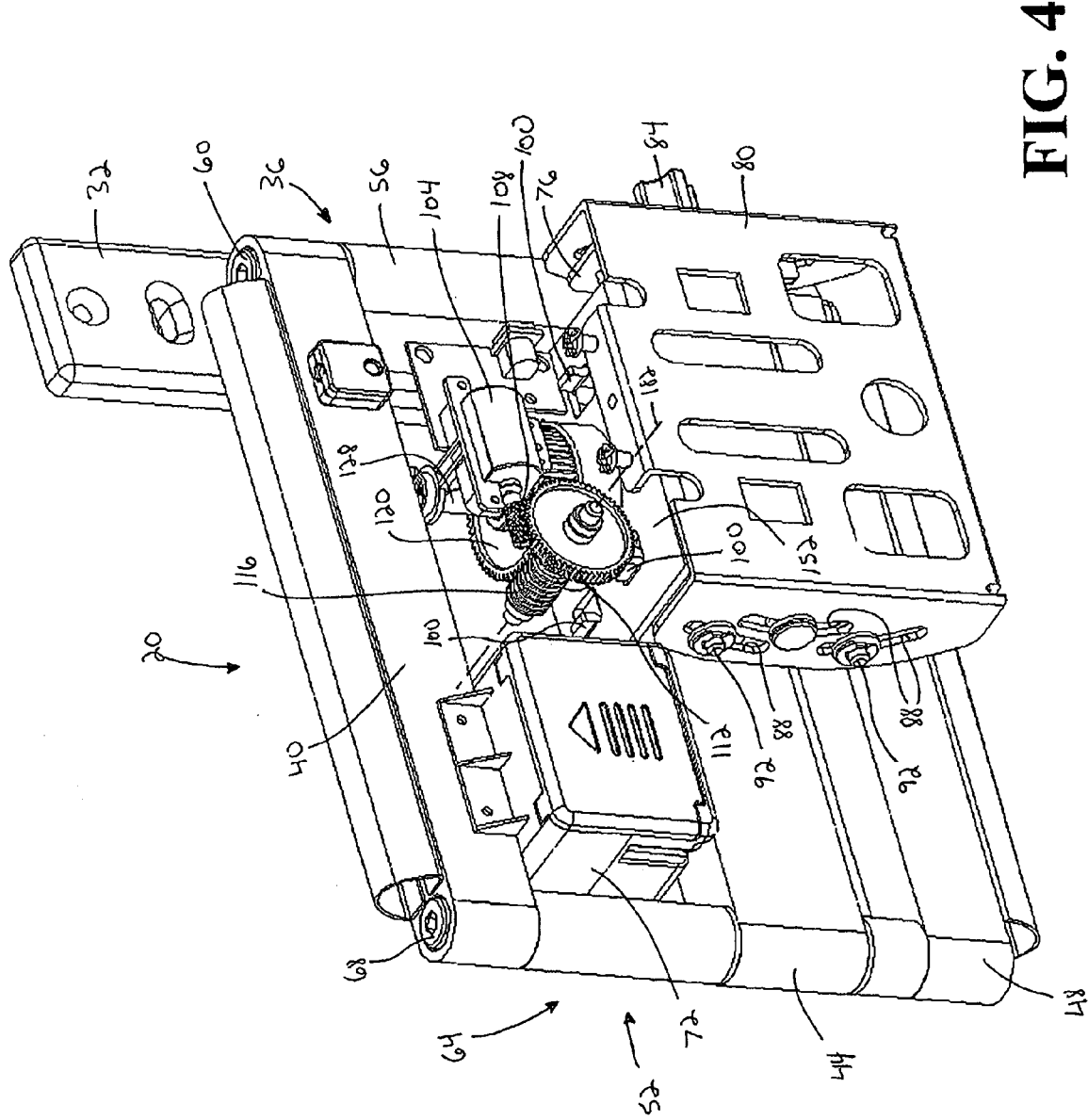
FIG. 4 is a front perspective view of the motorized support shown in FIG. 1A, shown with a gear housing removed.
Figure 5:
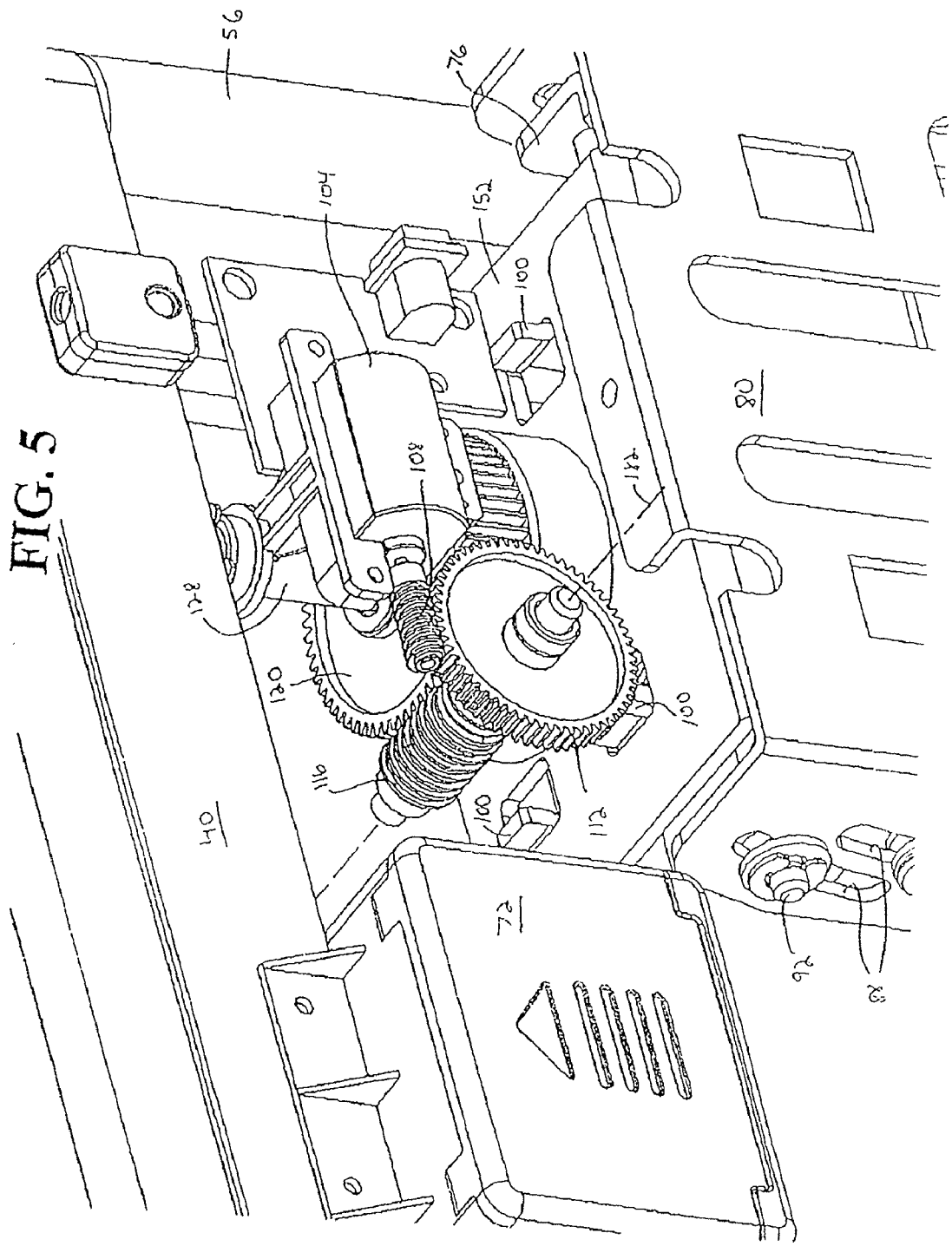
FIG. 5 is an enlarged front perspective view of a portion of the motorized support shown in FIG. 4.

With continued reference to FIG. 2, the motorized support 20 also includes a rotary bracket 76 and a tilt bracket 80. The rotary bracket 76 is coupled to the second link arm 44 (described in more detail below) and the tilt bracket 80 is connected to the rotary bracket 76. The brackets 24 and adapter plates 28 are connected to tilt bracket 80. The tilt bracket 80 facilitates forward and rearward tilting of the television about a horizontal axis. In other words, when a user is looking at a television supported by the motorized support 20 and the television is tilted, the user will see the top edge of the television move forward toward the user and the bottom edge of the television move rearward away from the user, or vice versa. The tilt bracket 80 includes a control knob 84 and arcuate grooves 88 (see FIGS. 4 and 5) on sides thereof for receiving tilting pins 92 (see FIGS. 4 and 5). A user loosens the control knob 84 to allow tilting of the television to a desired angle and tightens the control knob 84 to secure the television in the desired position. During tilting, the tilt 80 bracket pivots about the tilting pins 92, thereby causing the tilting pins 92 to move within the arcuate grooves 88. The shape and size of the grooves 88 limit the extent to which the television can tilt.

Referring now to FIGS. 2 and 4-6, the motorized support 20 further includes a gear housing 96 and a motor 104. The gear housing 96 is connected to the rotary bracket 76 via projections 100. In some constructions, the projections 100 are press-fit into the gear housing 96. The motorized support 20 also includes a gear assembly including a motor worm gear 108, a first transfer gear 112, and a second worm gear 116. The motorized support 20 further includes a second transfer gear 120. The motor 104 is powered by the batteries supported within the battery housing 72 or AC power, and is a bi-directional motor 104 operable to rotate the output shaft in either direction. The motor worm gear 108 is connected to the output shaft and engages the first transfer gear 112, which engages the second worm gear 116 via a first clutch 124 (see FIGS. 8 and 9). The second worm gear 116 engages the second transfer gear 120, which is pinned to and substantially concentric with a shaft 128.

Figure 8:
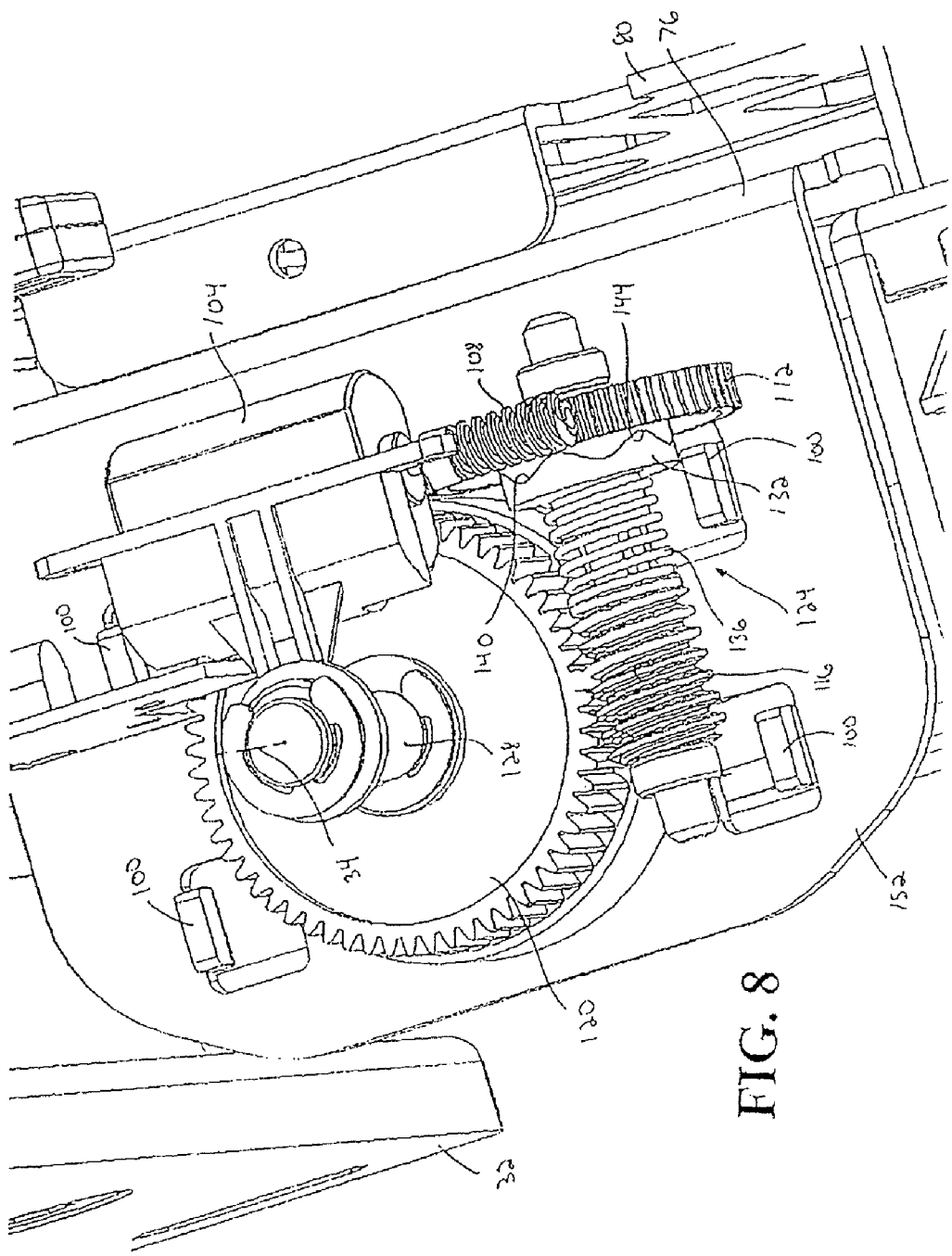
FIG. 8 is an enlarged perspective view of a portion of the motorized support shown in FIG. 1A, particularly showing a first clutch.
Figure 9:
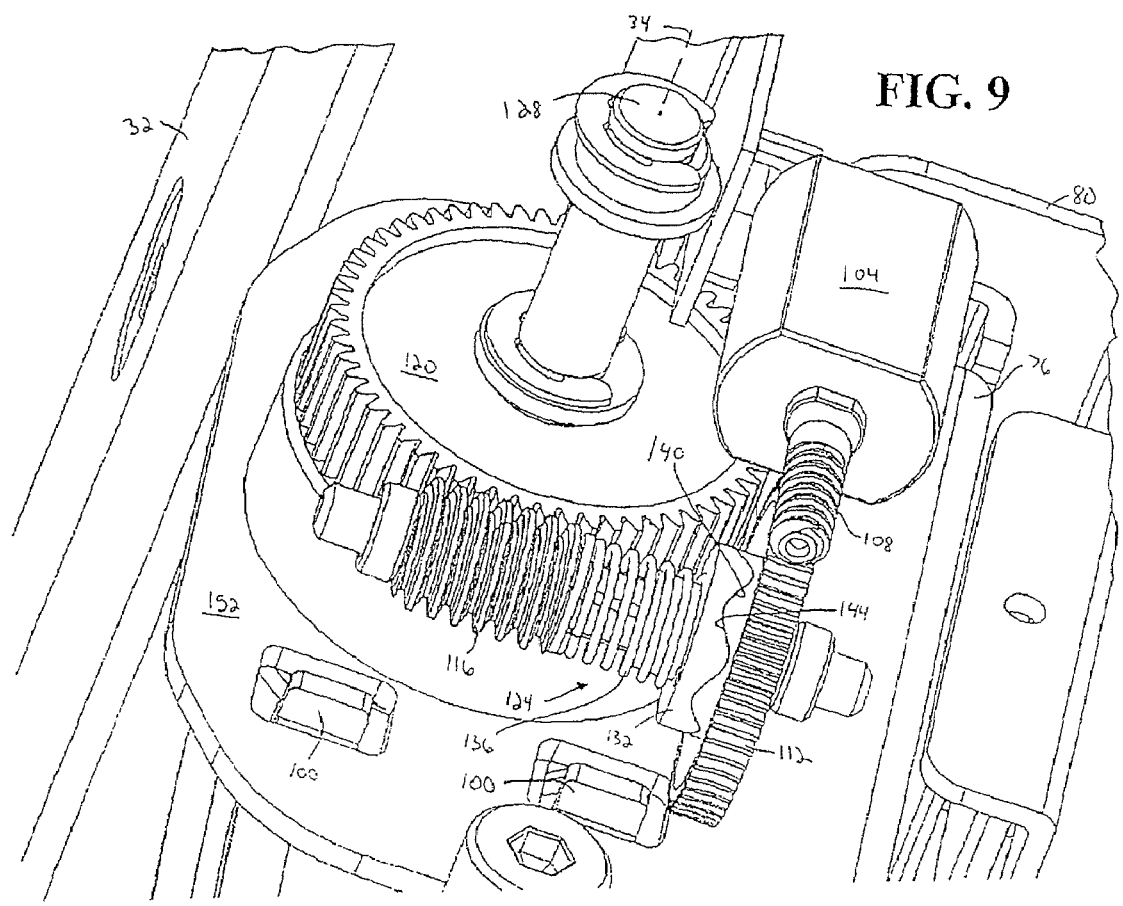
FIG. 9 is another perspective view of the first clutch shown in FIG. 8.

With reference to FIGS. 8 and 9, the first clutch 124 includes a clutch member or floating member 132 and a spring 136. The floating member 132 includes a wavy surface 140 that engages a complimentary wavy surface 144 defined on the first transfer gear 112. The spring 136 is compressed between the floating member 132 and the second worm gear 116, and the spring 136, the floating member 132, and the second worm gear 116 rotate together. The first clutch 124 is intended to inhibit stripping of the gears when panning of the television is hindered (described in more detail below).

Figure 18:
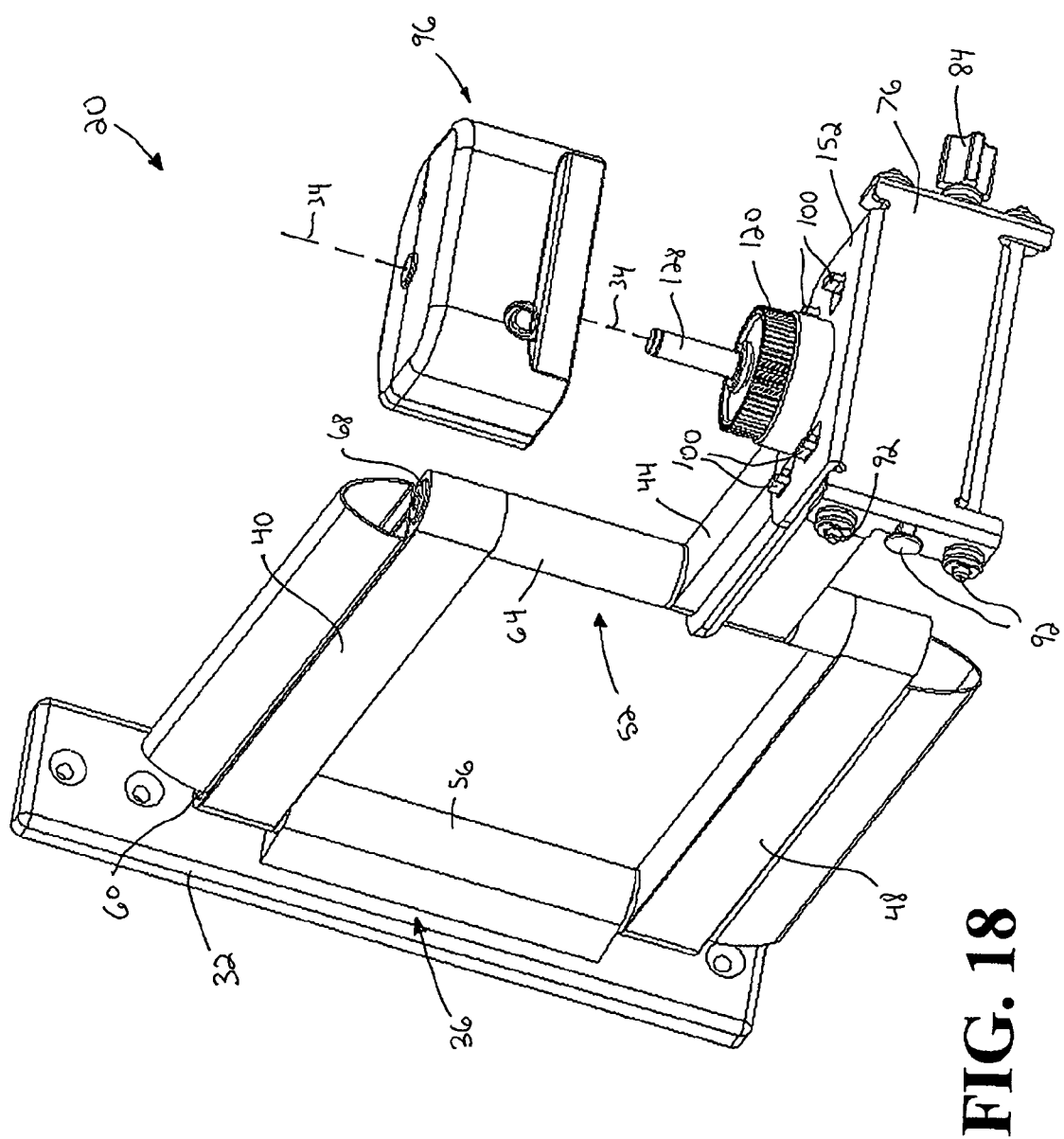
FIG. 18 is a top perspective view of the motorized support shown in FIG. 1A, shown with a gear housing and associated components removed as a single unit from the remainder of the motorized support.
Figure 19:
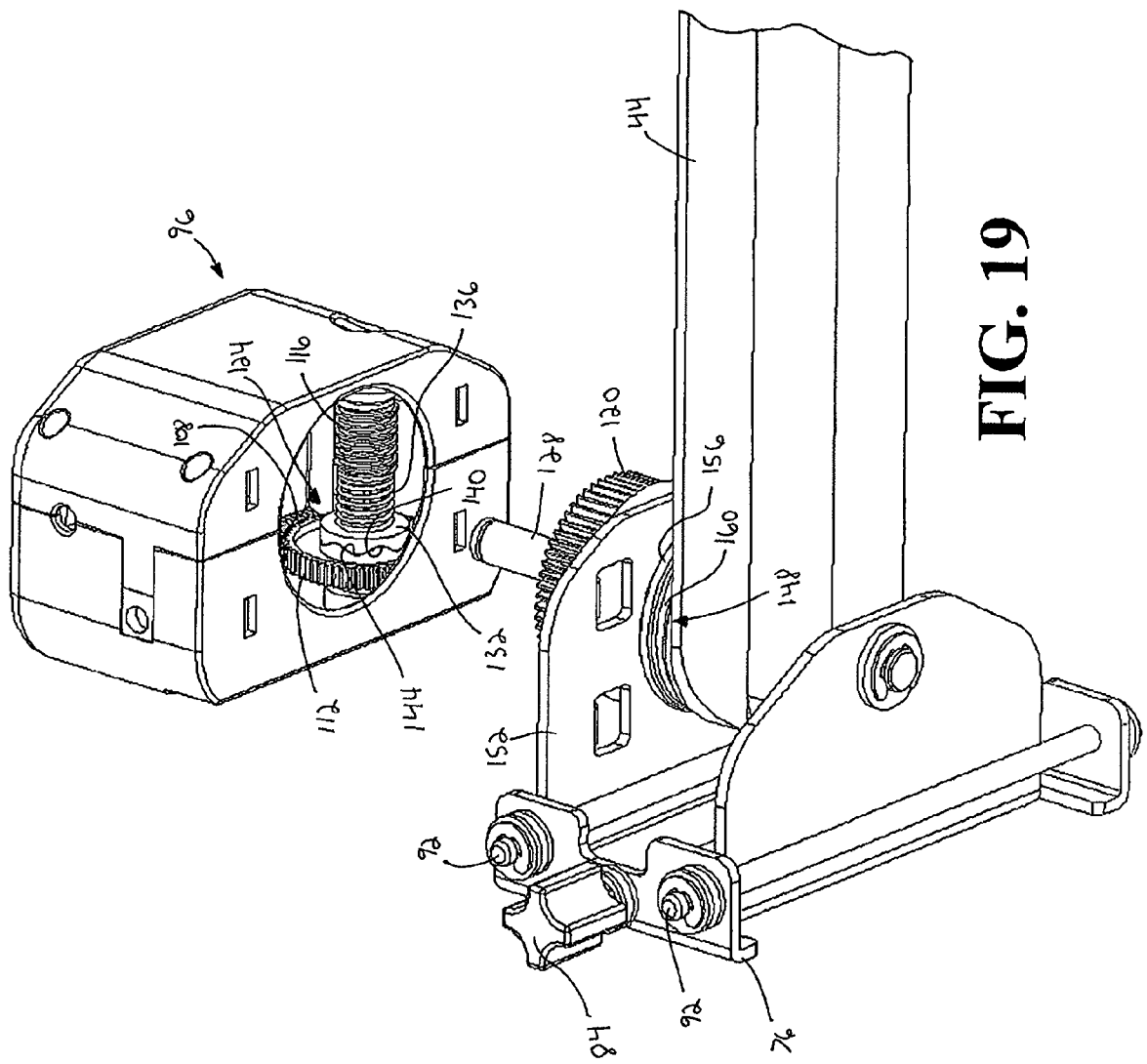
FIG. 19 is a bottom perspective view of a portion of the motorized support shown in FIG. 18, shown with the gear housing and associated components removed as a single unit from the remainder of the motorized support.
Figure 20:
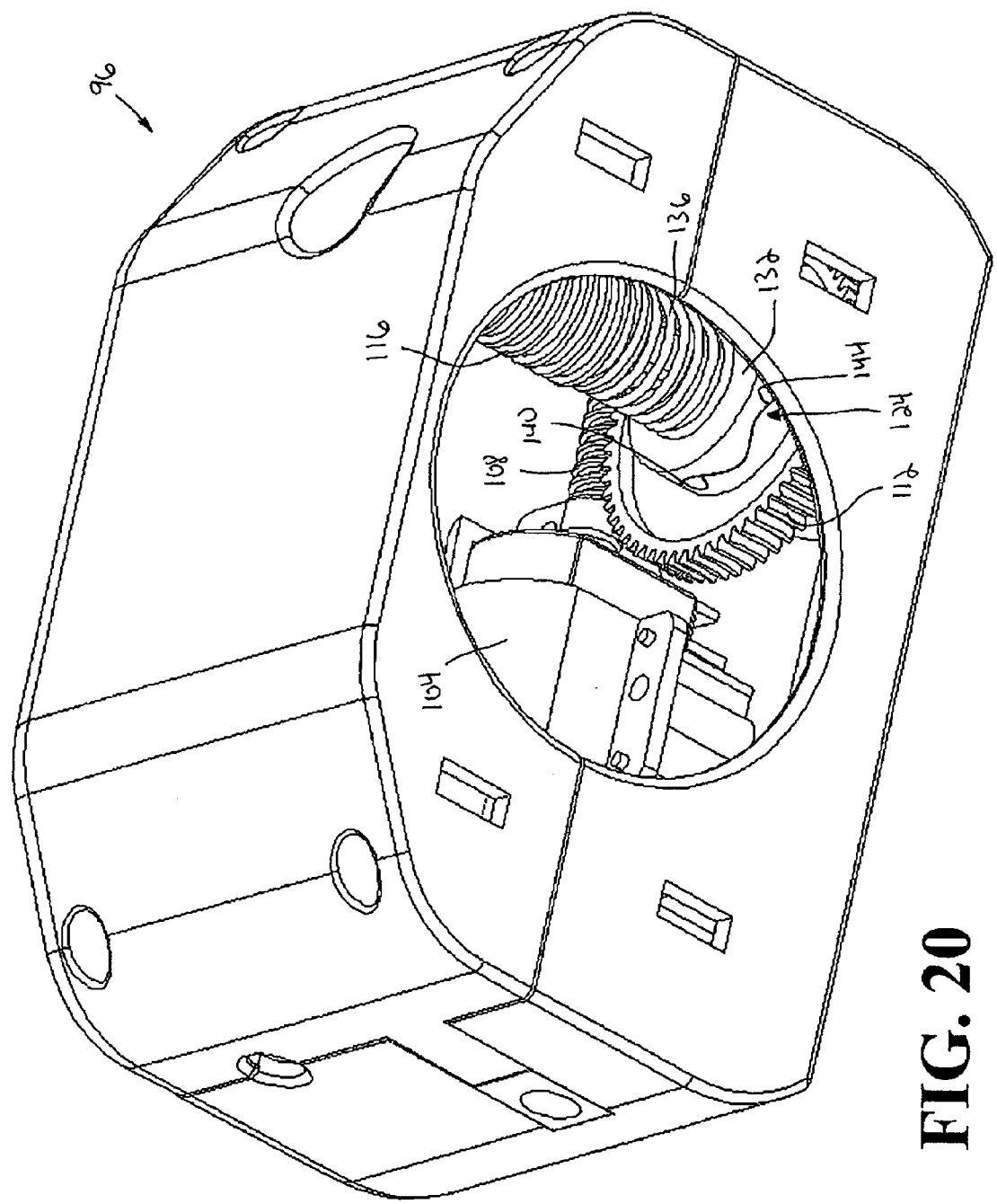
FIG. 20 is a bottom perspective view of the gear housing and associated components shown in FIGS. 18 and 19.

With reference to FIGS. 18-20, the motorized support 20 facilitates easy removal and replacement of mechanical components with very little effort. More particularly, mechanical components such as the motor 104, the motor worm gear 108, the first transfer gear 112, or the second worm gear 116 may become damaged or inoperative for their intended purposes and replacement of one or all of these components may be required. To facilitate easy and efficient removal of damaged or otherwise faulty mechanical components, the motor 104 and the gear assembly (i.e., the motor worm gear 108, the first transfer gear 112, and the second worm gear 116) are all housed within and supported by the gear housing 96 and are all removable with the gear housing 96 as a single unit. The second transfer gear 120 and shaft 128 remain connected to the remainder of the motorized support 20. A new gear housing 96 including a new motor 104 and new gear assembly (i.e., a new motor worm gear 108, a new first transfer gear 112, and a new second worm gear 116) may be connected to the top flange 152 of the rotary bracket 76 as a single unit in place of the removed gear housing 96 and associated mechanical components. This manner of removing mechanical components is much easier and efficient than individually disassembling, removing, and replacing the motor 104, the motor worm gear 108, the first transfer gear 112, and the second worm gear 116.

Figure 6:
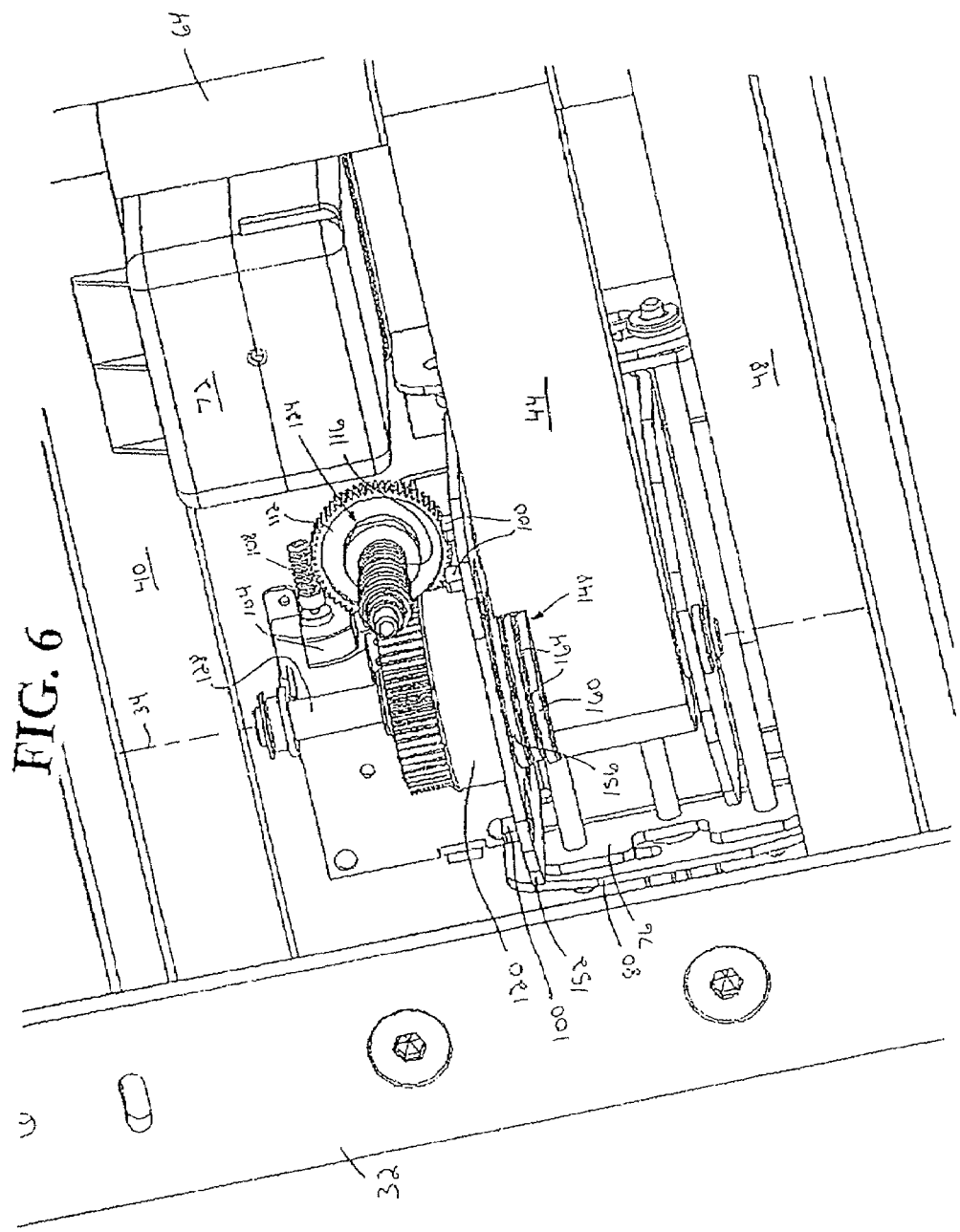
FIG. 6 is an enlarged rear perspective view of a portion of the motorized support shown in FIG. 1A.
Figure 7:
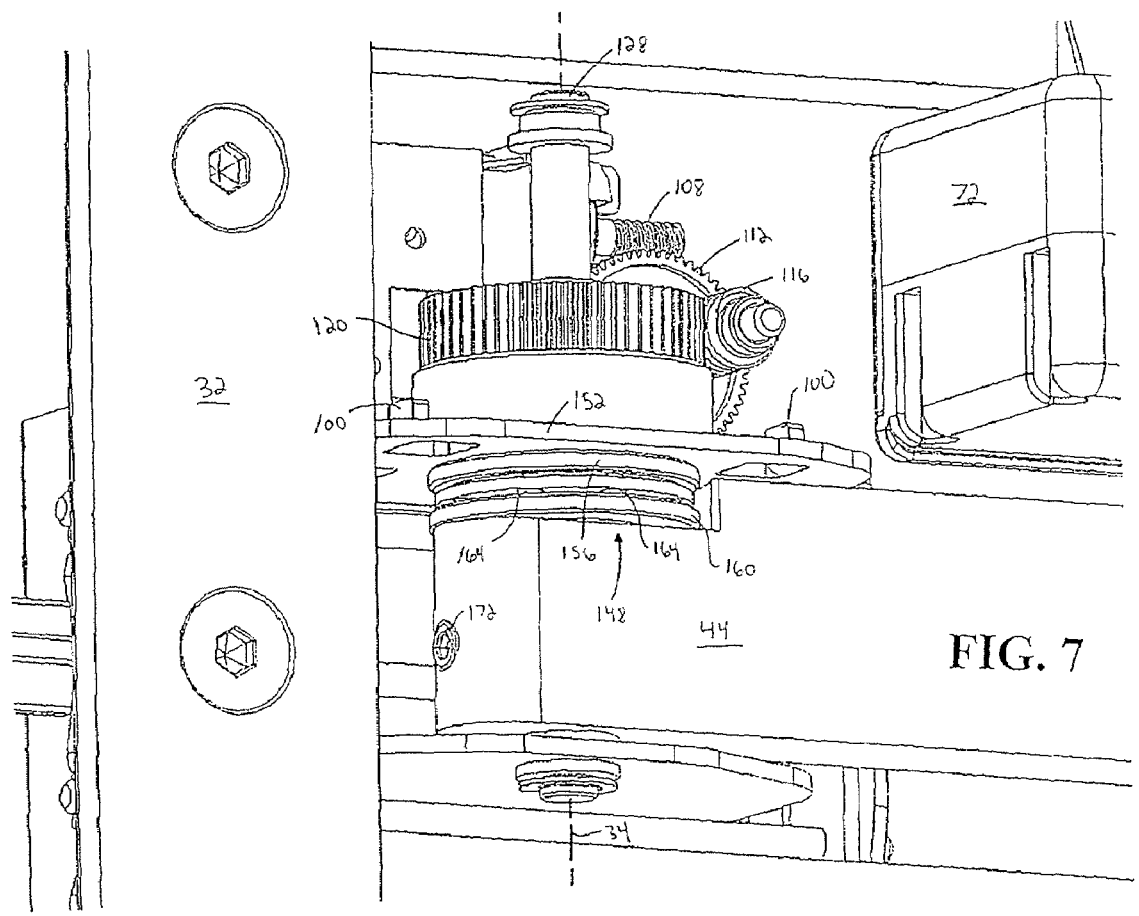
FIG. 7 is an enlarged perspective view of a portion of the motorized support shown in FIG. 1A, particularly showing a portion of a second link arm and a thrust bearing.

Referring now to FIGS. 6 and 7, a thrust bearing 148 is disposed between a top flange 152 of the rotary bracket 76 and a top surface of the second link arm 44, and is substantially concentrically positioned around the shaft 128. The thrust bearing 148 includes a rotary portion 156, a stationary portion 160, and a plurality of ball bearings 164 disposed between the rotary and stationary portions 156, 160 to reduce friction when the rotary portion 156 moves relative to the stationary portion 160. When a television is mounted to the motorized support 20, the weight of the television is transferred through the tilt bracket 80, through the rotary bracket 76, through the thrust bearing 148, and to the second link arm 44.

Figure 10:
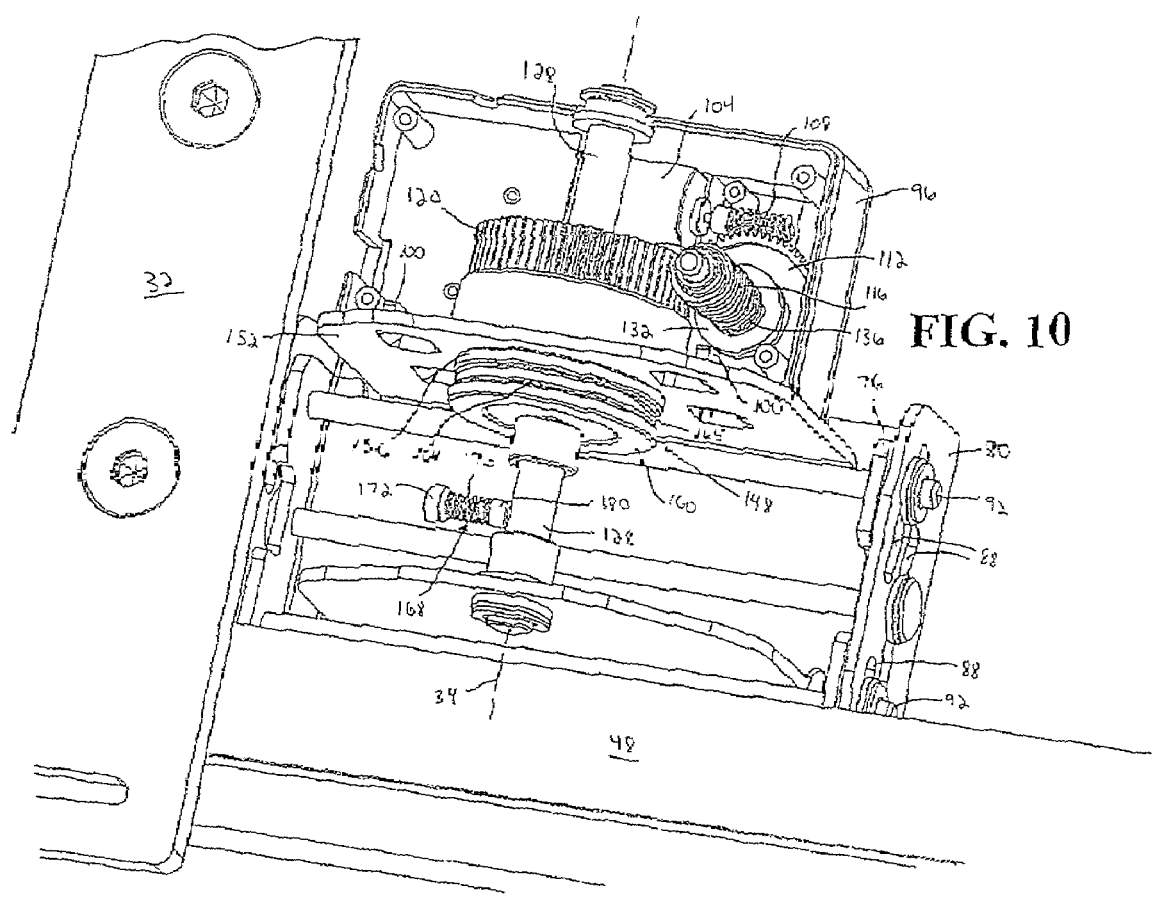
FIG. 10 is an enlarged rear perspective view of a portion of the motorized support shown in FIG. 1A, shown with the second link arm removed to expose a second clutch.
Figure 11:
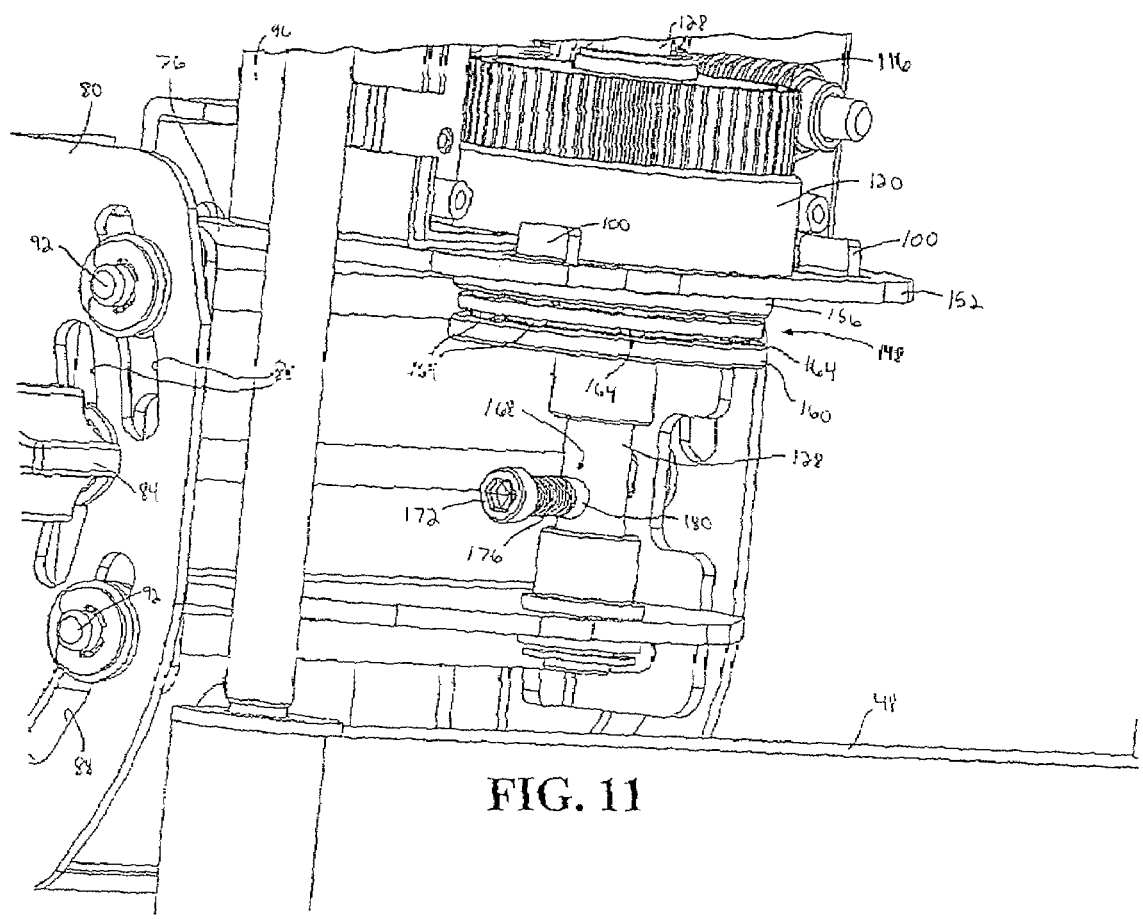
FIG. 11 is an enlarged perspective view of the second clutch shown in FIG. 10.
Figure 12:
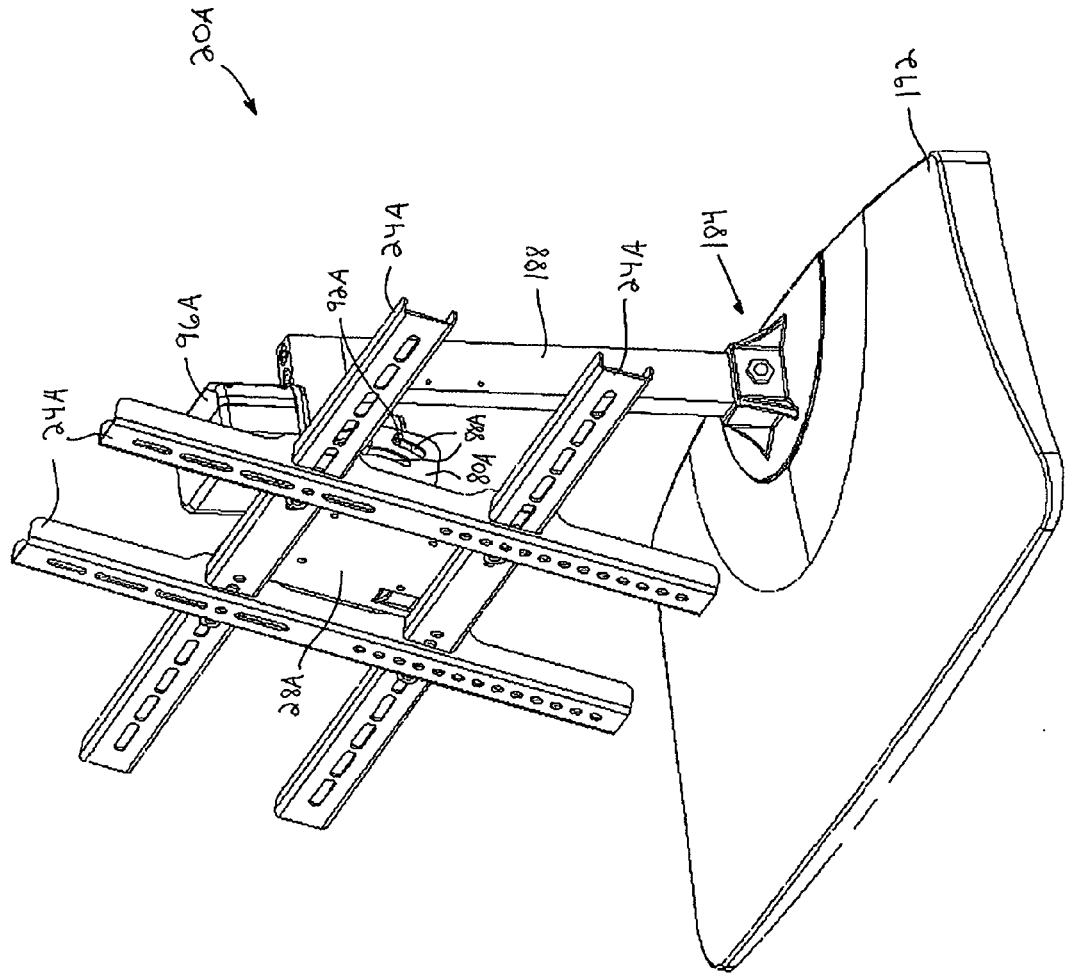
FIGS. 12-16 are various perspective views of an alternative embodiment of the motorized support shown in FIG. 1A.
Figure 13:
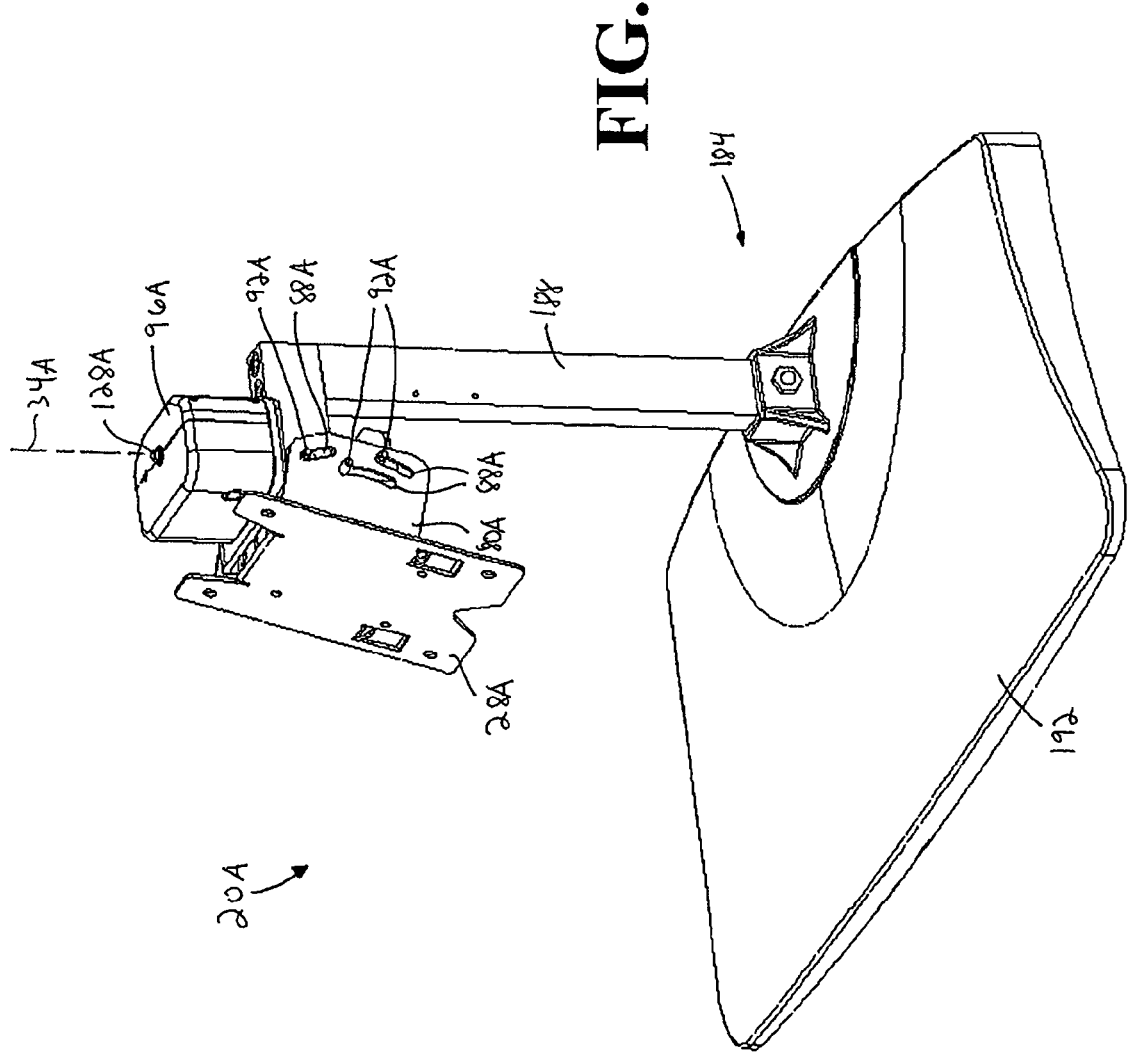
Figure 14:
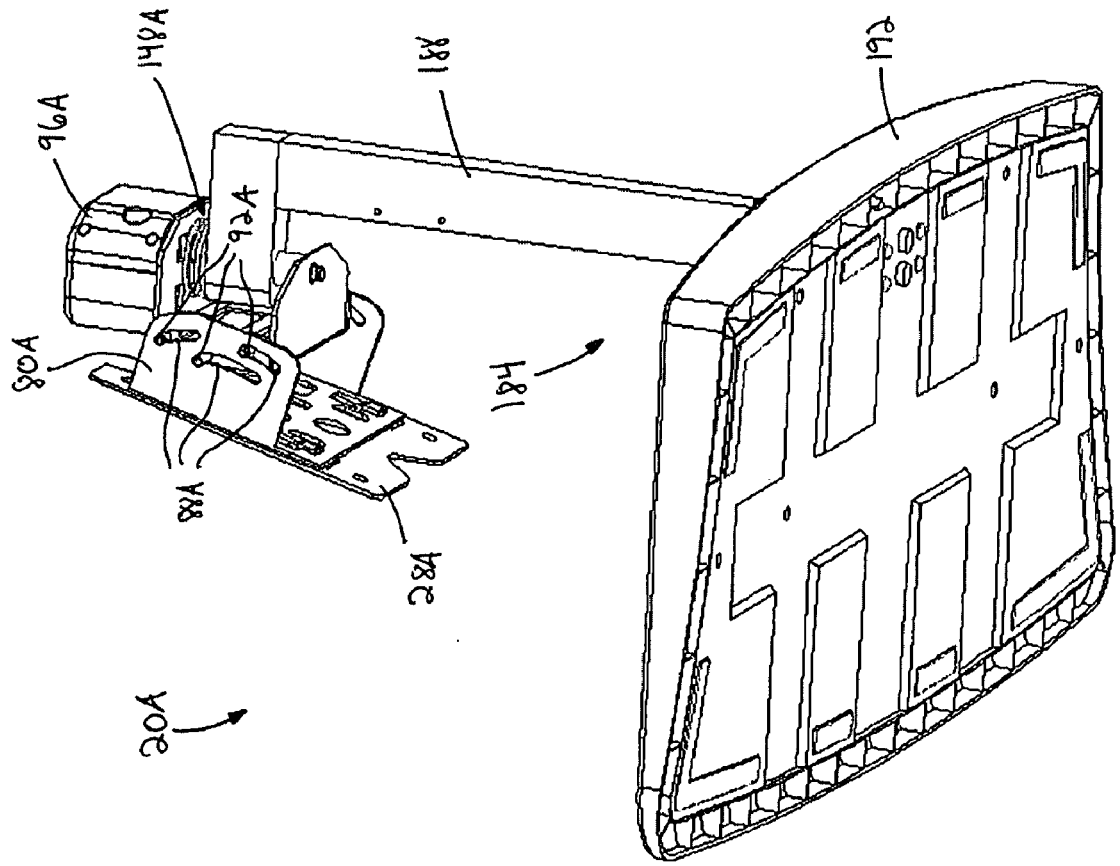
Figure 15:
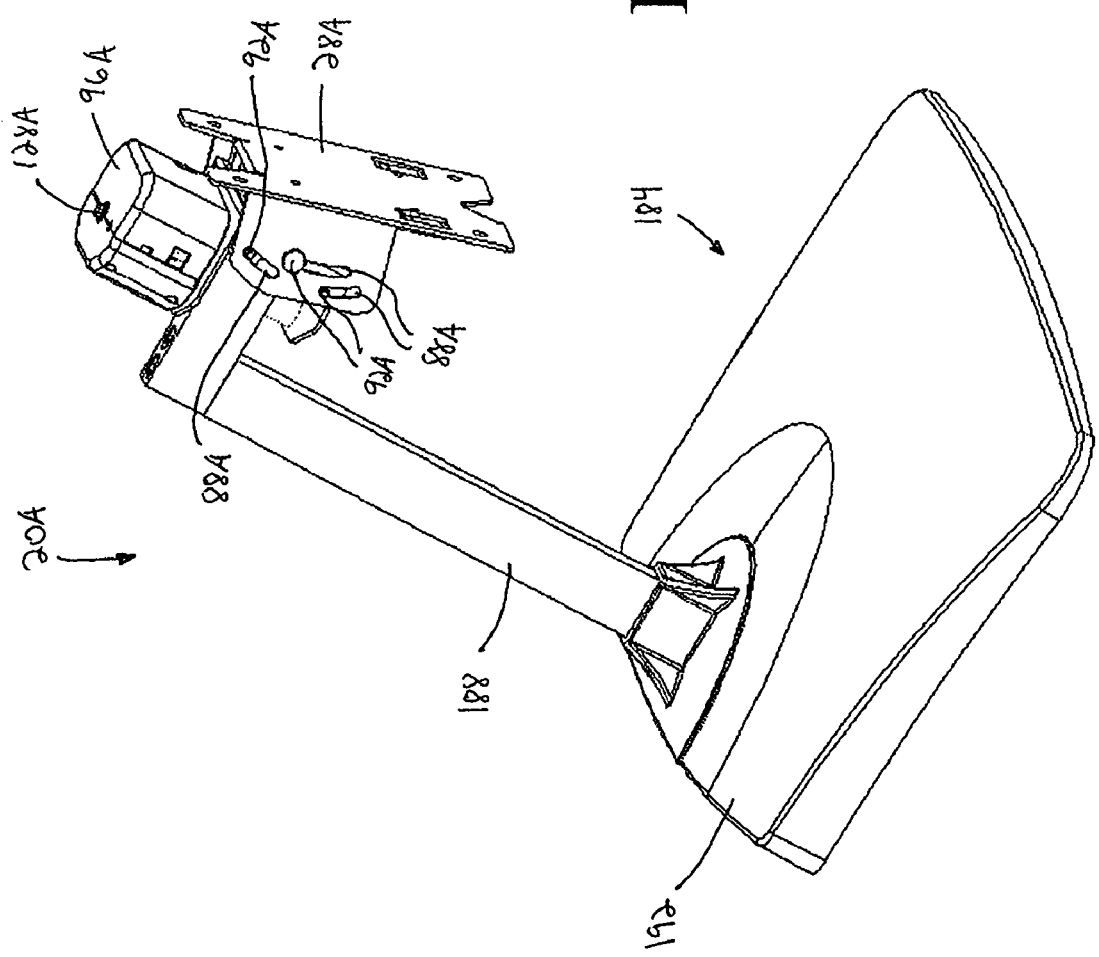
Figure 16:
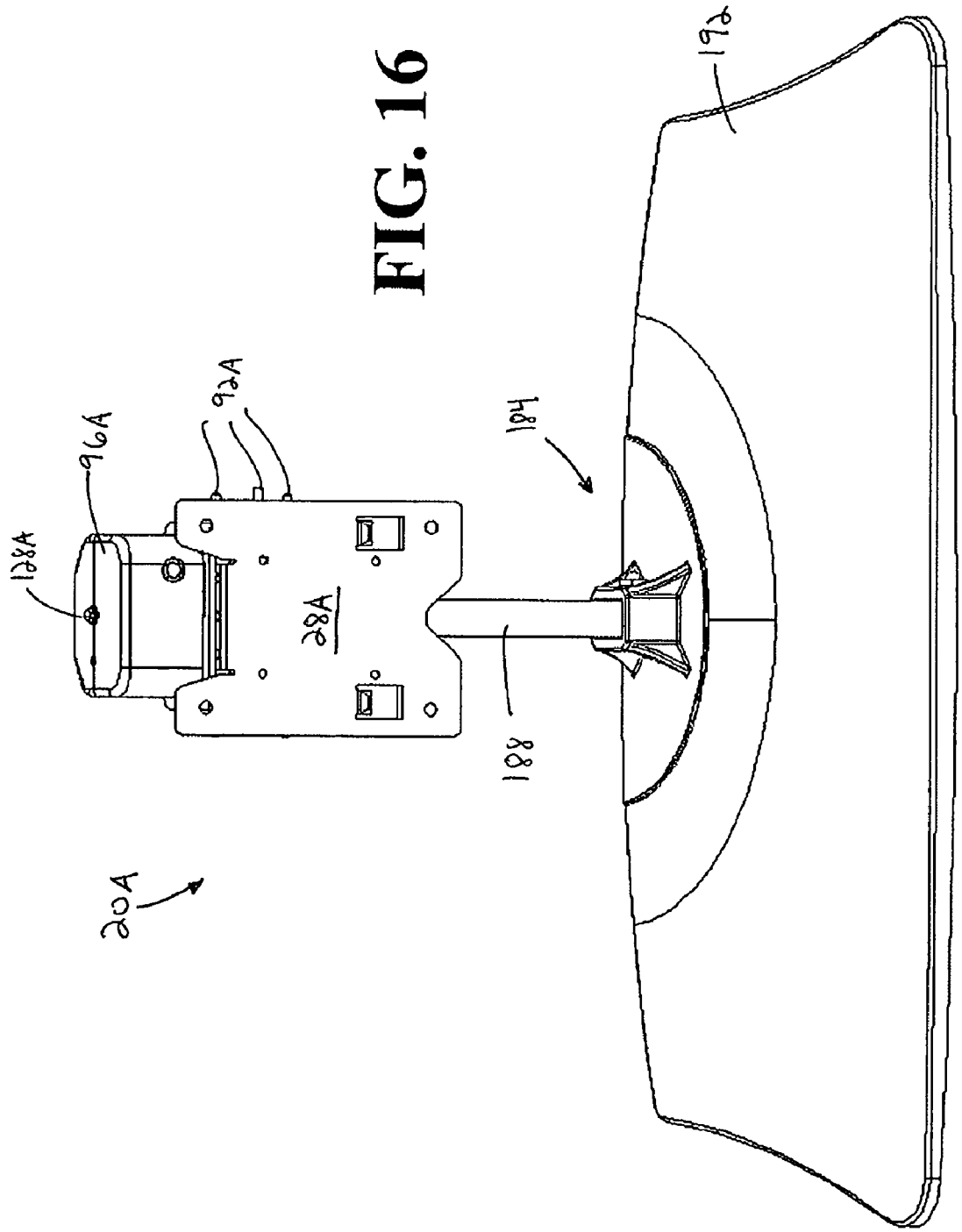

Referring now to FIGS. 7, 10, and 11, the motorized support 20 includes a second clutch 168. The second clutch 168 includes a head 172, a spring 176, and a friction pad 180. The head 172 is connected, preferably by threading, to the second link arm 44. The spring 176 is connected to the head 172 at one end and to the friction pad 180 at a second end. The friction pad 180 engages the shaft 128. Operation of the second clutch 168 will be described in more detail below.

Panning operation of the motorized support 20 will now be described. A user manually pulls the television away from the wall, decides in which direction panning is required, and then manipulates a remote control (preferably an infrared remote control, but other types of remote controls are acceptable) to activate the motor 104. The motor 104 turns the output shaft in the desired direction, which turns the motor worm gear 108, which turns the first transfer gear 112, which turns the second worm gear 116. The second transfer gear 120 is pinned to the shaft 128 so that the second transfer gear 120 does not move relative to the shaft 128. Engagement between the turning second worm gear 116 and the second transfer gear 120 causes the television to pan. During this panning, the shaft 128, the second transfer gear 120, the stationary portion 160 of the thrust bearing 148, and the second link arm 44 remain stationary, while the television, the tilt bracket 80, the rotary bracket 76, the gear housing 96, the motor 104, the motor worm gear 108, the first transfer gear 112, and the second worm gear 116 rotate around the shaft 128 and the second transfer gear 120.

Panning can be hindered in several manners such as, for example, the television engaging a wall. During normal panning operation of the motorized support 20 (i.e., when the television is free to pan without interference), the motor 104 rotates the motor worm gear 108, which rotates the first transfer gear 112. The spring 136 of the first clutch 124 biases the floating member 132 into engagement with the complimentary wavy surface 144 of the first transfer gear 112 and interlocks the complimentary wavy surfaces 140, 144. The force of the spring 136 is sufficient to maintain interlocking of the wavy surfaces 140, 144 during normal panning operation of the motorized support 20. This interlocking causes rotation of the first transfer gear 112 to be transferred to the floating member 132, which causes the floating member 132, the spring 136 and the second worm gear 116 to rotate, ultimately causing the television to pan. In the event the television abuts the wall or is otherwise prevented from panning, the first clutch 124 prevents the gears from stripping. When the television is prevented from panning, the force exerted on the gears is sufficient to overcome the bias of the spring 136. In such an instance, the motor 104 is still operating, causing the motor worm gear 108 and the first transfer gear 112 to rotate. However, the floating member 132 is not allowed to rotate. Instead, the force exerted on the gears overcomes the spring 136 and causes the wavy surface 144 of the first transfer member 112 to ride along the complimentary wavy surface 140 of the floating member 132, thereby forcing the floating member 132 against the spring 136 and away from the first transfer gear 112 along an axis 182 (see FIGS. 4 and 5), which is also the axis 182 about which the first transfer gear 112 rotates. When the floating member 132 is moved in this manner, the floating member 132 is not interlocked with the first transfer gear 112. As the wavy surface 144 rides along the wavy surface 140, a clicking sound is generated to alert the user that the television has contacted an obstruction and the button of the remote control should be released. Upon movement of the television out of abutment with the wall, the force is removed from the gears and the spring force is once again sufficient to maintain interlocking between the floating member 132 and the first transfer gear 112 to facilitate panning of the television.

The motorized support 20 may also be rotated through a panning motion by manual manipulation. A user grasps the television or bracket and rotates the television and bracket about axis 34. In addition, the support may be moved through a panning motion when a user is manually moving the support 20 between retracted and extended positions. In order to prevent stripping of the gears and motor during manual panning, the motorized support 20 includes the second clutch 168. As indicated above, the friction pad 180 exerts a force on the shaft 128. This force is sufficient to secure the second link arm 44 in a position relative to the shaft 128 during motorized panning of the television. In other words, when the motor 104 is driving the gears to pan the television, the television, the tilt bracket 80, the rotary bracket 76, the gear housing 96, the motor 104, the motor worm gear 108, the first transfer gear 112 and the second worm gear 116 elements move relative to the second link arm 44, the shaft 128, and the second transfer gear 116. In the event a user wishes to pan the television manually or if the motorized support 20 is being moved between extended and retracted positions, the force exerted on the shaft 128 by the friction pad 180 is easily overcome by a user and enables the user to pan the television without stripping the gears. During manual panning, the shaft 128 and second transfer gear 116 move with the components that move during motorized panning, and all move relative to the friction pad 180 and the second link arm 44. In the event a user wishes to adjust the friction between the second clutch 168 and the shaft 128, a user rotates the head 172 of the second clutch 168 in an appropriate direction to either increase or decrease the friction.

Referring to FIGS. 12-16, an alternative embodiment of the motorized support is illustrated. The motorized support 20A illustrated in FIGS. 12-16 is similar to the motorized support 20 illustrated in FIGS. 1-11 and 17-20 except for the differences discussed below. Those elements of the motorized support 20A illustrated in FIGS. 12-16 that are similar to elements of the motorized support 20 illustrated in FIGS. 1-11 and 17-20 are identified in the figures by the same reference number and an "A".

Contrary to the motorized support 20 illustrated in FIGS. 1-11 and 17-20 that is mountable to a wall or other substantially vertical support surface, the motorized support 20A illustrated in FIGS. 12-16 is supportable on or mountable to a substantially horizontal support surface. The motorized support 20A includes a stand 184 for supporting the motorized support 20A on a substantially horizontal support surface. The stand 184 includes an upright member 188 and a base 192. The base 192 can either rest upon a substantially horizontal support surface or can be fastened to a substantially horizontal support surface. The mechanism used to pan the television is substantially the same as the mechanism used to pan the television in the embodiment corresponding to FIGS. 1-11 and 17-20.

The embodiments described above and illustrated in the figures are presented by way of example only and are not intended as a limitation upon the concepts and principles of the present invention. Although particular constructions of the present invention have been shown and described, other alternative constructions will be apparent to those skilled in the art and are within the intended scope of the present invention.

We claim:

1. A support for an electronic display, the support comprising:
   a base;
   a bracket coupled to the base and operable to support the electronic display;
   a motor coupled to the bracket;
   a shaft coupled to the base and the bracket; and a clutch including a pad engaging the shaft and a biasing member exerting a biasing force on the pad toward the shaft, wherein the bracket is rotatable through a panning motion both by manual manipulation and by the motor, wherein, during activation of the motor, the motor rotates the bracket through the panning motion relative to the shaft, and, during manual rotation of the bracket through the panning motion, the bracket rotates with the shaft, and wherein engagement between the pad and the shaft is sufficient to fix the shaft during activation of the motor and allow rotation of the bracket relative to the shaft and is insufficient to fix the shaft during manual rotation of the bracket and allow rotation of the shaft with the bracket.

2. The support of claim 1, wherein the clutch is adjustable to adjust the biasing force exerted on the pad toward the shaft.

3. A motorized support for an electronic display, the motorized support comprising:

a base engagable with a support surface;

a bracket coupled to the base and operable to support the electronic display;

a motor coupled to the bracket for rotating the bracket through a panning motion; and a thrust bearing coupled between the base and the bracket, wherein the thrust bearing includes a first portion, a second portion, and a plurality of ball bearings positioned between the first and second portions, the first portion being movable relative to the second portion, the bracket being supported by the first portion and the second portion being coupled to the base, and wherein rotation of the bracket through the panning motion also rotates the first portion of the thrust bearing.

4. The motorized support of claim 3, wherein the support surface is a substantially vertical support surface, the motorized support further comprising an arm rotatably coupled to the base and the arm being movable between a retracted position, in which the arm is near the substantially vertical support surface, and an extended position, in which the arm is rotated away from the substantially vertical support surface, wherein the thrust bearing is positioned between the arm and the bracket such that the bracket is supported by the first portion and the second portion is supported by the arm, and wherein the bracket and the first portion are rotatable relative to the second portion and the arm.

5. The motorized support of claim 3, wherein the support surface is a substantially horizontal support surface, the motorized support further comprising an upright member supported by and extending upwardly from the base, the thrust bearing being positioned between the upright member and the bracket such that the bracket is supported by the first portion and the second portion is supported by the upright member, and wherein the bracket and the first portion are rotatable relative to the second portion and the upright member.

6. A motorized support for an electronic display, the motorized support comprising:

a base engagable with a support surface;

an arm rotatably coupled to the base;

a thrust bearing supported by the arm, the thrust bearing including a first portion, a second portion, and a plurality of ball bearings positioned between the first and second portions, the first portion being rotatable relative to the second portion and the second portion being supported by the arm;

a bracket supported by the first portion of the thrust bearing and being rotatable with the first portion relative to the second portion of the thrust bearing, the bracket being operable to support the electronic display and including an aperture therethrough;

a gear housing removably connected to the bracket;

a motor supported by the gear housing;

a gear assembly supported by the gear housing and coupled to the motor;

a shaft extending through the aperture in the bracket, the thrust bearing being substantially concentrically positioned around the shaft;

a transfer gear supported by the shaft and being substantially concentrically positioned around the shaft, wherein the transfer gear is fixed relative to the shaft and is coupled to the gear assembly;

wherein the arm is movable to position the bracket, and the electronic display when supported by the bracket, in any one of a retracted position, in which the bracket is positioned a first distance from the base, an extended position, in which the bracket is positioned a second distance from the base, and a plurality of intermediate positions between the retracted and extended positions, the second distance being greater than the first distance; and wherein activation of the motor causes the bracket to rotate about the transfer gear and the shaft, thereby causing the bracket, and the electronic display when supported by the bracket, to rotate through a panning motion.

7. The motorized support of claim 6, wherein the arm is a first arm, the motorized support further comprising a second arm rotatably connected to the base and the first arm is rotatably connected to the second arm, and wherein the first arm and the second arm cooperate to position the bracket in the retracted, extended, and intermediate positions.

8. The motorized support of claim 6, wherein the transfer gear is a first transfer gear, and wherein the gear assembly includes a first worm gear coupled to the motor, a second transfer gear supported by the gear housing and engaging the first worm gear, and a second worm gear supported by the gear housing and engaging the second transfer gear.

9. The motorized support of claim 8, wherein the first transfer gear engages the second worm gear.

10. The motorized support of claim 8, wherein activation of the motor rotates the first worm gear, which rotates the second transfer gear, which rotates the second worm gear, which engages the first transfer gear and causes the bracket, the gear housing, the motor, the first worm gear, the second transfer gear, and the second worm gear to rotate about the first transfer gear and the shaft.

* * * * *